(12) United States Patent
Norris et al.

(10) Patent No.: US 9,975,543 B1
(45) Date of Patent: May 22, 2018

(54) SYSTEMS AND METHODS FOR WASTE HEAT UTILIZATION IN COMBUSTION-ELECTRIC PROPULSION SYSTEMS

(71) Applicant: Cummins Emission Solutions Inc., Columbus (IN)

(72) Inventors: Colin L. Norris, Columbus, IN (US); Taren DeHart, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days. days.

(21) Appl. No.: 15/478,815

(22) Filed: Apr. 4, 2017

(51) Int. Cl.
| | |
|---|---|
| *B60W 20/16* | (2016.01) |
| *B60K 6/44* | (2007.10) |
| *B60L 11/14* | (2006.01) |
| *F01N 3/02* | (2006.01) |
| *F01N 3/01* | (2006.01) |
| *F01N 11/00* | (2006.01) |
| *B60W 20/40* | (2016.01) |

(52) U.S. Cl.
CPC .............. *B60W 20/16* (2016.01); *B60K 6/44* (2013.01); *B60L 11/14* (2013.01); *B60W 20/40* (2013.01); *F01N 3/01* (2013.01); *F01N 3/0205* (2013.01); *F01N 11/00* (2013.01); *B60W 2540/12* (2013.01)

(58) Field of Classification Search
CPC ....... B60R 16/03; B60W 10/06; B60W 10/08; B60W 10/30; B60W 20/1082; B60W 20/16; B60W 2710/0694; B60W 30/1882
See application file for complete search history.

(56) References Cited

U.S. PATENT DOCUMENTS

| | | | |
|---|---|---|---|
| 5,323,868 A | 6/1994 | Kawashima | |
| 5,397,550 A | 3/1995 | Marino, Jr. | |
| 5,404,720 A | 4/1995 | Laing | |
| 5,457,945 A | 10/1995 | Adiletta | |
| 6,912,848 B2 | 7/2005 | Bedapudi | |
| 7,469,532 B2 | 12/2008 | Williamson et al. | |
| 7,469,533 B2 | 12/2008 | Dawson et al. | |
| 7,503,168 B2 | 3/2009 | Clerc et al. | |

(Continued)

FOREIGN PATENT DOCUMENTS

KR 10-0712309 4/2007

*Primary Examiner* — John D Walters
*Assistant Examiner* — James J Triggs
(74) *Attorney, Agent, or Firm* — Foley & Lardner LLP

(57) ABSTRACT

A combustion-electric propulsion system includes an alternator, an engine control module, and an electric aftertreatment component. The alternator is configured to receive a rotational input from a driveshaft and to utilize the rotational input to generate electric energy. The engine control module is configured to receive an input. The input corresponds to a drive command or a brake command. The engine control module is configured to enter an idle mode while not receiving the drive command or the brake command. The electric aftertreatment component is configured to treat exhaust. The electric aftertreatment component includes a plurality of resistance elements that are electrically communicable with the alternator. The alternator is configured to selectively transmit the electric energy to the plurality of resistance elements when in the idle mode such that the plurality of resistance elements heat at least one of the exhaust and the electric aftertreatment component.

22 Claims, 7 Drawing Sheets

(56) References Cited

U.S. PATENT DOCUMENTS

| | | |
|---|---|---|
| 7,877,984 B2 | 2/2011 | Hinz et al. |
| 7,925,431 B2 | 4/2011 | Gallagher et al. |
| 8,042,326 B2 | 10/2011 | Farell et al. |
| 8,132,403 B2 | 3/2012 | Toshioka et al. |
| 8,240,138 B2 | 8/2012 | Lu et al. |
| 8,322,472 B2 | 12/2012 | Gonze |
| 8,327,623 B2 * | 12/2012 | Raman ............... B60K 6/46 |
| | | 105/35 |
| 8,512,658 B2 | 8/2013 | Eckhoff et al. |
| 8,701,394 B2 | 4/2014 | Sobue |
| 8,720,185 B2 | 5/2014 | Webb et al. |
| 8,820,060 B2 | 9/2014 | Cook |
| 8,831,858 B2 | 9/2014 | Roth et al. |
| 8,875,505 B2 | 11/2014 | Douglas et al. |
| 8,883,102 B1 | 11/2014 | Lambert et al. |
| 9,115,616 B2 * | 8/2015 | Zhang ............... F01N 3/2013 |
| 9,482,154 B2 * | 11/2016 | Van Niekerk .......... F01D 25/30 |
| 2012/0073273 A1 | 3/2012 | Asanuma et al. |
| 2013/0099561 A1 | 4/2013 | Raman |

* cited by examiner

SYSTEMS AND METHODS FOR WASTE HEAT UTILIZATION IN COMBUSTION-ELECTRIC PROPULSION SYSTEMS

TECHNICAL FIELD

The present application relates generally to the field of combustion-electric propulsion systems.

BACKGROUND

Internal combustion engines are often utilized in dual power applications where rotational energy provided by the internal combustion engine is transformed into electrical power. The electrical power may be utilized to, for example, provide power to electrical motors that provide rotational energy to wheels on a vehicle. The electrical motors may propel the vehicle during a driving mode. However, when the vehicle brakes, the electrical motors may generate electricity which is sent to a resistance grid, thereby generating heat. In conventional combustion-electric systems, this heat is typically vented to atmosphere through the use of a fan. As a result, a large amount of unused energy is wasted, and the conventional combustion-electric systems operate in an inefficient manner.

SUMMARY

In an embodiment, a combustion-electric propulsion system comprises an engine control module, an electric motor, and an electric aftertreatment component. The engine control module is configured to receive an input from a user. The input corresponds to a drive command or a brake command. The engine control module is configured to enter a drive mode while receiving the drive command and to enter a brake mode while receiving the brake command. The electric motor is electrically communicable with an alternator and the engine control module. The electric motor is configured to receive the electric energy from the alternator, to utilize the electric energy to cause rotation of a movement member in the drive mode, and to generate electric energy from rotation of the movement member when in the brake mode. The electric aftertreatment component is configured to treat exhaust. The electric aftertreatment component includes a plurality of resistance elements that are electrically communicable with the electric motor. The electric motor transmits a first portion of the electric energy to the resistance elements when in the brake mode such that the resistance elements heat at least one of the exhaust and the electric aftertreatment component. The electric motor simultaneously transmits a second portion of the electric energy to the alternator when in the brake mode.

In another embodiment, a combustion-electric propulsion system includes an alternator, an engine control module, and an electric aftertreatment component. The alternator is configured to receive a rotational input from a driveshaft and to utilize the rotational input to generate electric energy. The engine control module is configured to receive an input. The input corresponds to a drive command or a brake command. The engine control module is configured to enter an idle mode while not receiving the drive command or the brake command. The electric aftertreatment component is configured to treat exhaust. The electric aftertreatment component includes a plurality of resistance elements that are electrically communicable with the alternator. The alternator is configured to selectively transmit the electric energy to the plurality of resistance elements when in the idle mode such that the plurality of resistance elements heat at least one of the exhaust and the electric aftertreatment component.

In still another embodiment, a combustion-electric propulsion system includes a clutch, a movement member, an alternator, an engine control module, and an electric aftertreatment component. The clutch is configured to receive a rotational input from a driveshaft. The clutch is operable between an engaged state and a disengaged state. The clutch is configured to provide a rotational output only when in the engaged state. The movement member is selectively coupled to the clutch and configured to receive the rotational output provided by the clutch when the clutch is in the engaged state. The alternator is configured to receive a rotational input from the clutch when the clutch is in the engaged state and the disengaged state. The alternator is configured to utilize the rotational input to generate electric energy. The engine control module is configured to receive an input corresponding to a drive command. The engine control module is configured to enter an idle mode while not receiving the drive command. The electric aftertreatment component is configured to treat exhaust. The electric aftertreatment component is defined by a plurality of flow sub paths. The electric aftertreatment component includes a plurality of resistance elements that are electrically communicable with the alternator and arranged within the plurality of flow sub paths such that each of the plurality of flow sub paths can be independently heated by the plurality of resistance elements. The alternator is configured to selectively transmit the electric energy to the plurality of resistance elements when in the idle mode such that the plurality of resistance elements heat at least one of the exhaust and the electric aftertreatment component.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
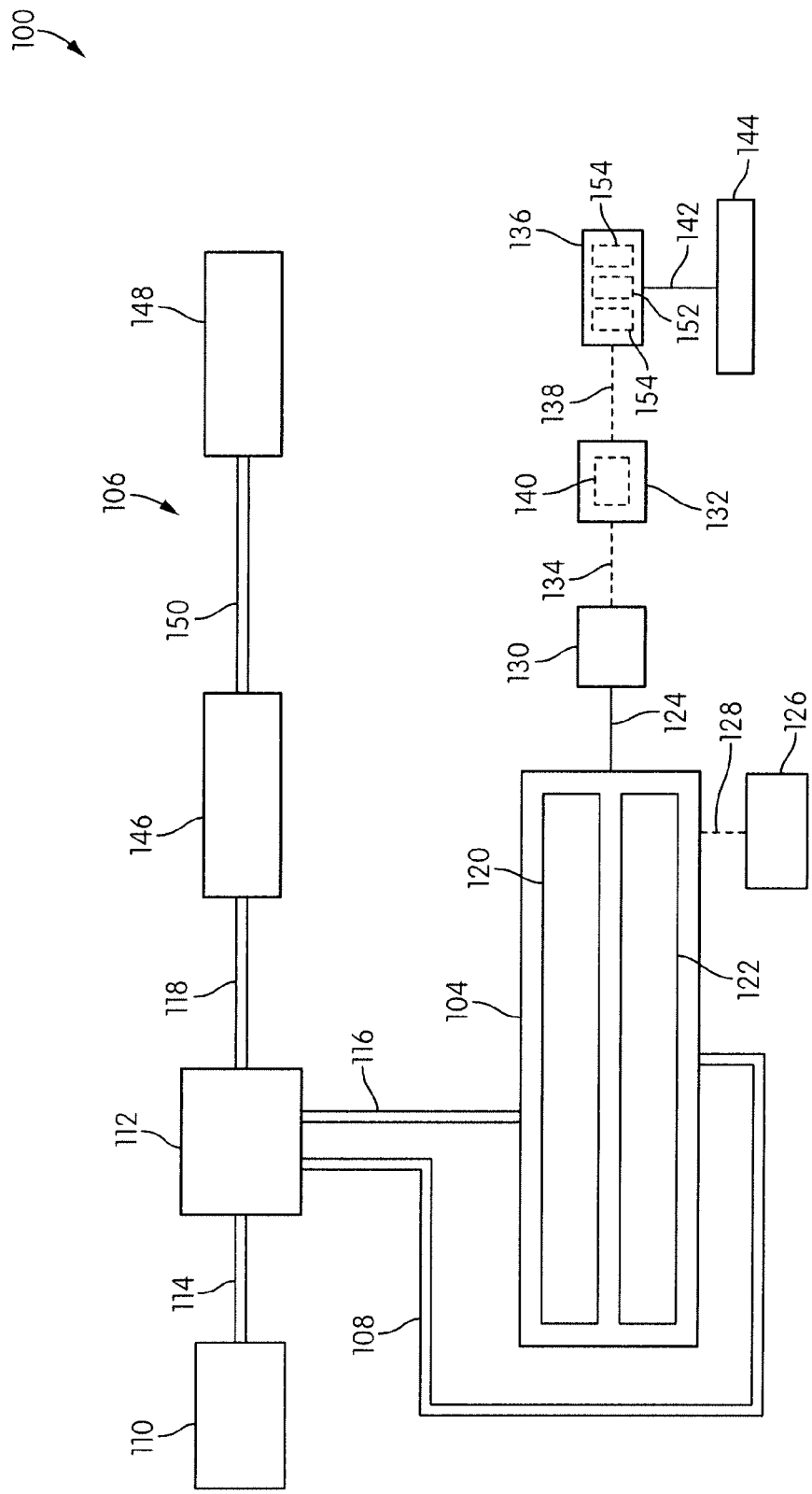
FIG. 1 is a block schematic diagram of an example combustion-electric propulsion system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for heating an aftertreatment component in an internal combustion engine system to facilitate, among other things, cleaning of deposits from the aftertreatment component without requiring a corresponding decrease in efficiency of the internal combustion engine system. The various concepts introduced above and discussed in greater detail below may be implemented in any of numerous ways as the described concepts are not limited to any particular manner of implementation. Examples of specific implementations and applications are provided primarily for illustrative purposes.

I. Overview

Diesel engines may be utilized in a conventional combustion-electric propulsion system. The conventional combustion-electric propulsion system first converts energy from diesel fuel into rotational energy using the diesel engine. The conventional combustion-electric propulsion system then converts that rotational energy into electricity using an alternator.

The conventional combustion-electric propulsion system provides the electricity to an electric motor. The electric energy is selectively utilized by the electric motor to provide rotational energy to, for example, a wheel. In this way, the diesel engine may provide energy that is utilized by the electric motor to rotate the wheel. Combustion-electric propulsion systems may be implemented in a variety of applications such as diesel-electric vehicles (e.g., locomotive, commercial vehicles, haul trucks, semis, construction vehicles, military vehicles, etc.) and maritime vehicles (e.g., cargo vessels, cruise vessels, military vehicles, etc.).

The conventional combustion-electric propulsion system is operable between a normal operation and a braking operation. In the normal operation, the electric motors rotate the wheel resulting in propulsion of the vehicle. For example, a driver may increasingly depress a gas pedal on a commercial vehicle having a conventional combustion-electric propulsion system to cause the vehicle to go faster by varying a throttle that controls the rotation of the wheel by the electric motor. In response to the throttle, the electric motor can draw increasingly more electricity from the alternator.

The conventional combustion-electric propulsion system enters the braking operation when a user activates a brake. For example, a user may depress a brake pedal in a vehicle. In the braking operation, rotation of the shaft of the electric motor causes the electric motor to generate electricity. The electricity generated by the electric motor in the braking operation may be transmitted to a resistor grid (e.g., braking resistor, etc.). The resistor grid may be utilized to dissipate heat to slow down rotation of the shaft of the electric motor.

The resistor grid may be relatively large and produce a large amount of heat. As a result, conventional combustion-electric propulsion systems typically include fans that assist the resistor grid in rejecting the heat to atmosphere. These fans are typically powered by the alternator, thereby utilizing energy produced by the engine. By wasting this heat and consuming energy with fans, many conventional combustion-electric propulsion systems waste energy that could otherwise be harnessed to improve operation (e.g., efficiency, etc.) of the conventional combustion-electric propulsion systems. Further, fuel is utilized to drive the fan which would otherwise not be required, thereby decreasing the desirability of the conventional combustion-electric propulsion systems.

Diesel internal combustion engines typically incorporate aftertreatment systems to treat exhaust prior to the exhaust being discharged to atmosphere. These aftertreatment systems may absorb exhaust particles and become saturated over time. In order to maintain the health of the aftertreatment systems, conventional diesel internal combustion systems are operated at a lower efficiency for a period of time in order to increase a temperature of the exhaust within the aftertreatment system. This elevated temperature may, for example, facilitate cleaning of deposits.

Implementations described herein relate to directly heating an aftertreatment component (such as a particulate filter, a SCR catalyst, etc.) or heating exhaust upstream of the aftertreatment component and downstream of a manifold. The aftertreatment component may include resistance elements that are selectively powered by an engine control unit to provide heat. The resistance elements may receive electric energy from an electric motor associated with a movement member or from an alternator. In some applications, the resistance elements are powered when the engine control unit is in one of a brake mode and an idle mode. For example, in the brake mode, the electric motor may generate electric energy that is provided to both the alternator and the aftertreatment component. In the idle mode, the alternator may provide the electric energy to the resistance elements.

In the implementations described herein, the resistance elements are utilized to cause an increase in temperature of the aftertreatment component. In this way, cleaning of deposits within the aftertreatment component is possible. Previously, such cleaning was traditionally accomplished by decreasing the efficiency of an internal combustion engine to cause an increase in exhaust temperature. For example, some conventional combustion-electric propulsion systems burn diesel fuel across a diesel oxidation catalyst which wastes the diesel fuel and results in inefficient operation. However, through the use of the implementations described herein, this cleaning can be accomplished while maintaining efficient operation of the internal combustion engine.

In some implementations, the aftertreatment component is defined by a plurality of flow sub paths. The resistance elements may each be associated with one of the flow sub paths. The engine control unit may clean each of the flow sub paths independent from one another such that the aftertreatment component is incrementally cleaned.

Through the use of the implementations described herein, the cost associated with a combustion-electric propulsion system is significantly decreased because a separate resistor grid is no longer required. Additionally, a fan associated with the separate resistor may be relatively smaller in size or may not be included at all. This decreases the amount of space consumed by the combustion-electric propulsion system and reduces costs associated with operating the combustion-electric propulsion system by minimizing fuel consumed during braking and cleaning of the aftertreatment component. In these ways, health management of the aftertreatment component is simplified and optimized, and costs associated therewith are minimized.

II. Overview of Combustion-Electric Propulsion System

FIG. 1 depicts an example combustion-electric propulsion system 100. The combustion-electric propulsion system 100 may be implemented in a variety of applications such as diesel-electric vehicles (e.g., locomotive, commercial vehicles, haul trucks, semis, construction vehicles, military vehicles, etc.) and maritime vehicles (e.g., cargo vessels, cruise vessels, military vehicles, etc.). The combustion-electric propulsion system 100 includes an internal combustion engine 104 and an exhaust system 106. The internal combustion engine 104 receives air from a first inlet conduit 108 that receives the air from an air source 110. The air source 110 may be, for example, an air intake, an air filter, a ram air intake, and other similar air sources.

According to an exemplary embodiment, the combustion-electric propulsion system 100 includes a turbocharger 112. In this embodiment, the turbocharger 112 receives air from the air source 110 via a second inlet conduit 114 and provides the air through the first inlet conduit 108 to the internal combustion engine 104. Following the exemplary embodiment, the exhaust system 106 includes a first outlet conduit 116 that receives exhaust (e.g., exhaust gasses, etc.) from the internal combustion engine 104 and provides the exhaust to the turbocharger 112. The turbocharger 112 utilizes the exhaust to alter the pressure and/or flow rate of air moving through the turbocharger 112 from the second inlet conduit 114 to the first inlet conduit 108. The exhaust system 106 also includes a second outlet conduit 118 that receives the exhaust from the turbocharger 112.

In embodiments where the combustion-electric propulsion system 100 does not include the turbocharger 112, the second inlet conduit 114 is continuous with the first inlet conduit 108 and the first outlet conduit 116 is continuous with the second outlet conduit 118. For example, the exhaust system 106 may only include one of the first inlet conduit 108 and the second inlet conduit 114 and one of the first outlet conduit 116 and the second outlet conduit 118.

According to an exemplary embodiment, the internal combustion engine 104 is a diesel engine configured to combust diesel fuel. In various embodiments, the internal combustion engine 104 includes a rail fuel system 120 that provides the fuel to pistons within the internal combustion engine 104. The rail fuel system 120 may be, for example, a common rail fuel system. The internal combustion engine 104 may also include an aftercooler 122. The aftercooler 122 may cool the air from the first inlet conduit 108 prior to being utilized by the internal combustion engine 104 in a combustion process. For example, the aftercooler 122 may be utilized in combination with the turbocharger 112 to remove any condensed moisture in the air in the first inlet conduit 108. The aftercooler 122 may be, for example, an intercooler, a heat exchanger, a fin heat exchanger, a cross flow heat exchanger, a tube and plate heat exchanger, and other similar devices.

The internal combustion engine 104 also includes a driveshaft 124. The internal combustion engine 104 is operational to cause rotation of the driveshaft 124. Rotation of the driveshaft 124 may be defined by a number of rotations per minute, a torque, or a power. The combustion-electric propulsion system 100 also includes an engine control module (ECM) 126 which is coupled to the engine via wires 128. The ECM 126 is configured to control operation of the internal combustion engine 104. For example, the ECM 126 may be configured to alter the rotations per minute of the driveshaft 124. The ECM 126 may receive inputs from a user (e.g., a driver, etc.). For example, in response to receiving a drive (e.g., throttle, acceleration, etc.) command (e.g., via depression of an acceleration pedal by a user, etc.), the ECM 126 may utilize the rail fuel system 120 to introduce more fuel into the internal combustion engine 104. The wires 128 may couple the ECM 126 to various valves, injectors, spark plugs, glow plugs, sensors, and other similar devices. In this way, the ECM 126 may receive information from the internal combustion engine 104. The ECM 126 may provide this information to the user (e.g., through a display, a speedometer, a cluster, etc.).

The combustion-electric propulsion system 100 also includes an alternator 130 coupled to (e.g., attached to, connected to, etc.) the driveshaft 124. The alternator 130 is configured to (e.g., structured to, etc.) convert (e.g., transform, etc.) rotation of the driveshaft 124 into electric energy (e.g., electricity, etc.). The alternator 130 may include a rotor and a stator (e.g., windings, etc.). For example, the driveshaft 124 may be coupled to the rotor and configured to rotate within the stator. Rotation of the rotor relative to the stator may cause the alternator 130 to generate electricity. The alternator 130 may be a variable speed alternator that generates electricity at different ranges of rotational speeds of the driveshaft 124. The alternator 130 may produce alternating current (AC) electric energy or direct current (DC) electric energy.

According to various embodiments, the combustion-electric propulsion system 100 also includes an energy storage device 132. The energy storage device 132 is coupled to the alternator 130 through wires 134 such that the energy storage device 132 receives electric energy from the alternator 130. The energy storage device 132 is configured to store and selectively provide the electric energy to an electric motor 136 via wires 138. The energy storage device 132 may be, for example, a capacitor, a flywheel, a capacitor bank, a battery bank, a fuel cell, and other similar devices capable of storing energy. In some embodiments, the combustion-electric propulsion system 100 does not include the energy storage device 132. In these embodiments, the wires 134 may be connected directly to the wires 138.

The energy storage device 132 may include a alternator controller 140 that controls the flow of electric energy into the energy storage device 132 and the flow of electric energy out of the energy storage device 132. For example, the alternator controller 140 may modulate an amount of energy provided to the electric motor 136 based on an input from a user (e.g., via an acceleration pedal, etc.). The alternator controller 140 may be communicable with the ECM 126. Alternatively, the ECM 126 may directly control the energy storage device 132 and does not include the alternator controller 140. The energy storage device 132 may also include a resistor bank for dissipating electric energy from the alternator 130 (i.e., when the energy storage device 132 is at full capacity, etc.).

The alternator controller 140 may include a microprocessor, an application-specific integrated circuit (ASIC), a field-programmable gate array (FPGA), etc., or combinations thereof. The alternator controller 140 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the alternator controller 140 can read instructions. The instructions may include code from any suitable programming language.

The electric motor 136 includes a driveshaft 142 that is coupled to a movement member 144. The electric motor 136 is configured to utilize electric energy received from the energy storage device 132 and/or the alternator 130. The electric motor 136 is configured to (e.g., structured to, etc.)

convert (e.g., transform, etc.) the electric energy into rotation of the driveshaft 142 thereby causing corresponding rotation of the movement member 144. In some applications, the driveshaft 142 is coupled directly to the movement member 144. In other applications, the driveshaft 142 is connected to the movement member 144 through a gear train, chain, drive belt, pulley, or other similar system. The movement member 144 may be a wheel (e.g., automotive wheel, locomotive wheel, tread wheel, construction vehicle wheel, military vehicle wheel, etc.), a propeller (e.g., ship propeller, etc.), or any other similar movement member.

The combustion-electric propulsion system 100 also includes an aftertreatment, component 146. The aftertreatment component 146 receives the exhaust from the turbocharger 112 and/or the internal combustion engine 104. For example, the aftertreatment component 146 receives the exhaust via the second outlet conduit 118. The aftertreatment component 146 is configured to treat (e.g., filter, etc.) the exhaust. For example, the aftertreatment component 146 may capture exhaust gasses and/or remove particulate matter (PM), such as soot, from the exhaust. The aftertreatment component 146 may treat $NO_X$ to provide nitrogen gas and water vapor. The aftertreatment component 146 may constitute aftertreatment components such as a selective catalytic reduction (SCR) catalyst, a diesel oxidation catalyst (DOC), a perforated tube, a pipe, a manifold, a filter (e.g., diesel particulate filter, etc.), a decomposition chamber or reactor, a doser, a dosing module, and others. The aftertreatment component 146 provides the treated exhaust to an exhaust outlet 148 via a third outlet conduit 150. The exhaust outlet 148 may be, for example, a tailpipe, a muffler, or other similar structure.

The combustion-electric propulsion system 100 is operable in a drive mode. In the drive mode, the electric motor 136 causes rotation of the movement member 144. The electric motor 136 may be controlled in response to an input from the user. For example, the combustion-electric propulsion system 100 may enter the drive mode when the user depresses an acceleration pedal in a vehicle containing the combustion-electric propulsion system 100. According to various embodiments, the combustion-electric propulsion system 100 exits the drive mode when a user inputs a brake command (e.g., by depressing a brake pedal, etc.). When the ECM 126 receives the brake command, the ECM 126 enters a brake mode.

According to various embodiments, the electric motor 136 includes a rotor 152 and a stator 154. The electric motor 136 provides rotational input to the driveshaft 142 when the combustion-electric propulsion system 100 is in the drive mode. Depending on the configuration of the electric motor 136 (e.g., DC motor, AC motor, brushless motor, etc.), different mechanisms for causing rotation of the driveshaft 142 are possible. However, while in the brake mode, the electric motor 136 facilitates braking (e.g., deceleration, etc.) of the movement member 144. In the brake mode, the electric motor 136 transforms a rotational input from the movement member 144, via the driveshaft 142, into electric energy. This generation of electricity by the electric motor 136 also resists rotation of the driveshaft 142 thereby slowing rotation of the movement member 144.

III. Example Brake Activated Heating Systems

Figure 2:
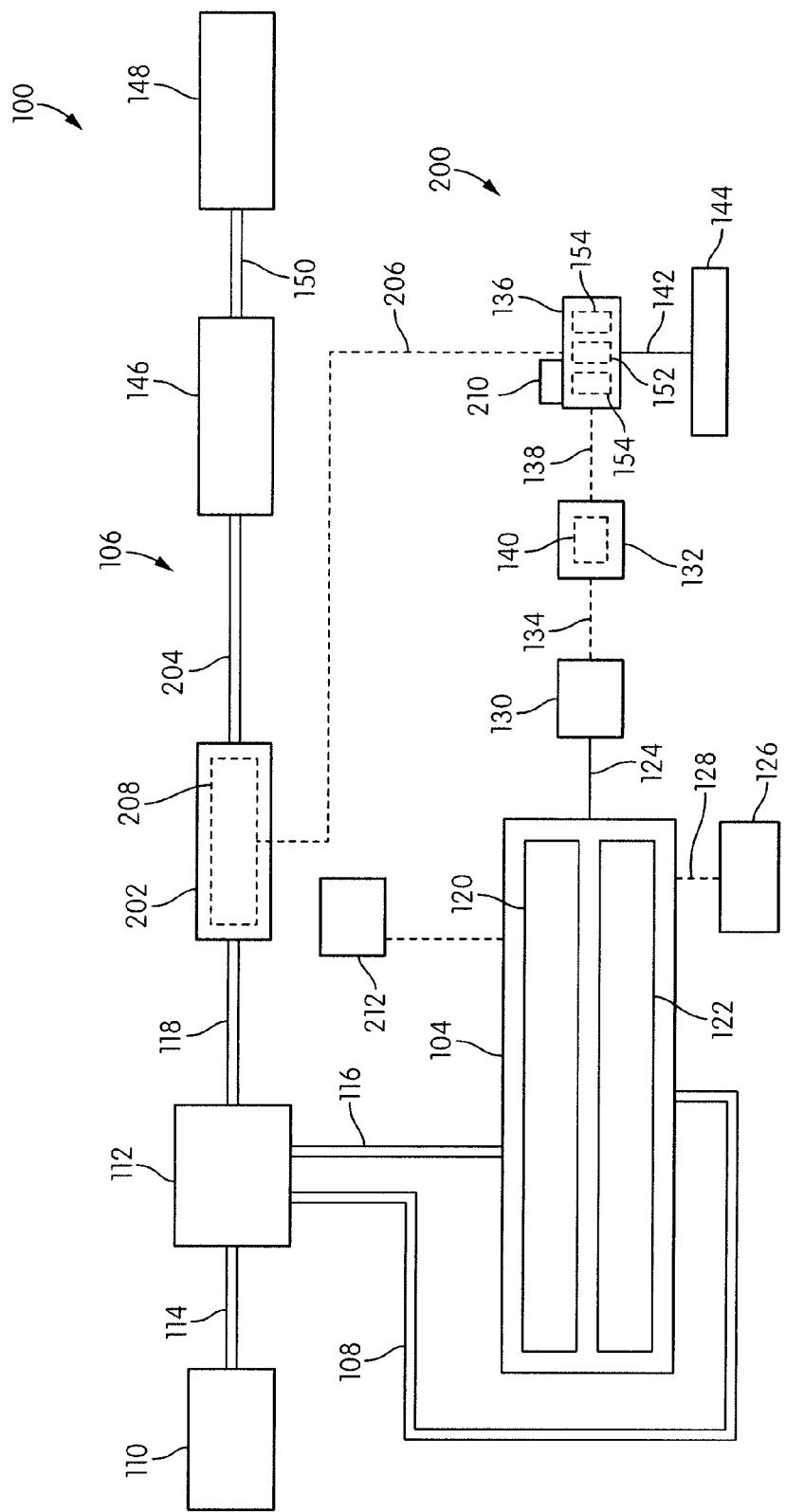
FIG. 2 is a block schematic diagram of an example combustion-electric propulsion system having an example brake activated heating system.

FIG. 2 depicts an example brake activated heating system 200 for the combustion-electric propulsion system 100. The brake activated heating system 200 includes an electric heater 202. The electric heater 202 receives electric energy from the electric motor 136 via wires 206 when the combustion-electric propulsion system 100 is in the brake mode. For example, rotation of the rotor 152 within the stator 154 may produce electric energy. The electric heater 202 receives the exhaust from the second outlet conduit 118 and provides the exhaust to a fourth outlet conduit 204. The electric heater 202 functions to selectively heat the exhaust prior to entering the aftertreatment component 146.

The electric heater 202 includes resistance elements 208 that receive the electric energy from the electric motor 136 and convert the electric energy into heat which is dissipated into the exhaust. For example, the resistance elements 208 may obtain a temperature of approximate two-hundred and fifty degrees Celsius. In this way, the electric heater 202 causes an increase in temperature of the exhaust. The resistance elements 208 may be, for example, a plurality of electric resistors, a resistance grid, a heating element (e.g., a folded tubular heating element, etc.), a ceramic heating element, a metallic heating element, a polymeric heating element, a composite heating element, a coiled heating element, and other similar structures. The resistance elements 208 may be circumferentially disposed within the electric heater 202. The resistance elements 208 may also be disposed along an interior plane of the electric heater 202.

Through the use of the electric heater 202, the exhaust gasses within the aftertreatment component 146 are caused to increase in temperature when the combustion-electric propulsion system 100 is in the brake mode. This elevated temperature may, for example, clean carbon deposits, prevent excess accumulation of unburned hydrocarbons, and prevent the plugging of catalyst channels with deposits such as coking, ammonium bisulfate, and urea compounds.

In addition to utilizing the electricity generated by the electric motor 136 to heat the exhaust using the electric heater 202, the brake activated heating system 200 also may provide electric energy to the alternator 130 when in the brake mode. For example, the electric motor 136 may provide the electric energy to the wires 134, 138, the energy storage device 132, and the alternator 130. By providing electric energy to the alternator 130, the electric motor 136 may motor the internal combustion engine 104. When the internal combustion engine 104 is motored, the internal combustion engine 104 may not be provided fuel. In this way, combustion within the internal combustion engine 104 is prevented or minimized when the internal combustion engine 104 is motored by the alternator 130.

The alternator 130 may cause and/or assist rotation of the driveshaft 124. In this way, the brake activated heating system 200 may increase the speed of the internal combustion engine 104. Motoring of the internal combustion engine 104 may, for example, act as an air pump to cool the electric heater 202 (i.e., by creating an air flow). In an exemplary embodiment, motoring of the internal combustion engine 104 causes rotation of a fan 212 that is structured to provide cooling to the electric heater 202. Motoring of the internal combustion engine 104 may also reduce fuel consumption and/or increase efficiency of the internal combustion engine 104. The quantity of electrical energy that motoring the internal combustion engine 104 could adsorb (e.g., utilize, consume, etc.) could be increased or decreased by activating electric powered accessories or engine accessories such as a hydraulic pump, a variable-geometry, turbocharger (VGT), an exhaust throttle, and other similar accessories. In an exemplary embodiment, the brake activated heating system 200 is implemented to provide electric energy generated by the electric motor 136 to the electric heater 202 (i.e., to heat the exhaust) and to the alternator 130 to motor the internal combustion engine 104 and thereby cool the electric heater 202. For example, the ECM 126 may cause a first portion of the electric energy generated by the electric motor 136 to be provided to the electric heater 202 and a second portion of the electric energy generated by the electric motor 136 to be provided to the alternator 130 to motor the internal combustion engine.

According to various embodiments, the brake activated heating system 200 includes a powertrain controller 210. The electric heater 202 and/or the alternator 130 are electrically or communicatively coupled to the powertrain controller 210. The powertrain controller 210 may dictate, for example, an amount of electric energy that is provided to the electric heater 202 and an amount of electric energy that is provided to the alternator 130. The powertrain controller 210 may control the amount of electric energy provided to the electric heater 202 to achieve a target exhaust temperature. For example, the powertrain controller 210 may monitor the temperature of the aftertreatment component 146 through the use of a sensor (e.g., thermocouple, etc.) and compare the monitored temperature to a target temperature. Following this example, the powertrain controller 210 may route electric energy to the alternator 130 when the aftertreatment component 146 has a temperature, as sensed by the sensor, substantially equal to the target temperature. The target temperature may be stored in a memory of the powertrain controller 210. Similar temperature monitoring may also be performed with a sensor incorporated in the electric heater 202. The powertrain controller 210 may also function to selectively charge the energy storage device 132. In some embodiments, the target temperature is equal to a maximum desirable temperature of the aftertreatment component 146 (e.g., a maximum catalyst temperature, etc.). In these embodiments, the aftertreatment component 146 may be provided electrical energy to cause an increase in temperature of the aftertreatment component 146 until the aftertreatment component t 146 obtains the target temperature. In this way, the health of the aftertreatment component 146 may be managed and preserved.

The powertrain controller 210 may include a microprocessor, an ASIC, a FPGA, etc., or combinations thereof. The powertrain controller 210 may include memory, which may include, but is not limited to, electronic, optical, magnetic, or any other storage or transmission device capable of providing a processor, ASIC, FPGA, etc. with program instructions. The memory may include a memory chip, EEPROM, EPROM, flash memory, or any other suitable memory from which the powertrain controller 210 can read instructions. The instructions may include code from any suitable programming language.

In comparison to the brake activated heating system 200, conventional diesel engines do not harness the electricity produced when braking to heat exhaust. Instead, conventional diesel engines include aftertreatment systems that are cleaned by intentionally operating the diesel engine inefficiently in order to increase an exhaust temperature. In this way, the brake activated heating system 200 facilitates health management of the aftertreatment component 146 while maintaining desirable operation of the internal combustion engine 104. The brake activated heating system 200 also facilitates health management of the aftertreatment component 146 upon each instance of braking. In this way, the aftertreatment component 146 may be maintained at a greater temperature then in conventional diesel engines. As a result, the aftertreatment component 146 may be at a greater temperature when in the drive mode compared to aftertreatment systems in conventional diesel engines, resulting in more desirable emissions and/or lower dosing of exhaust. These benefits and others may facilitate a cost savings associated with use of the combustion-electric propulsion system 100 compared to conventional diesel engines.

Figure 3:
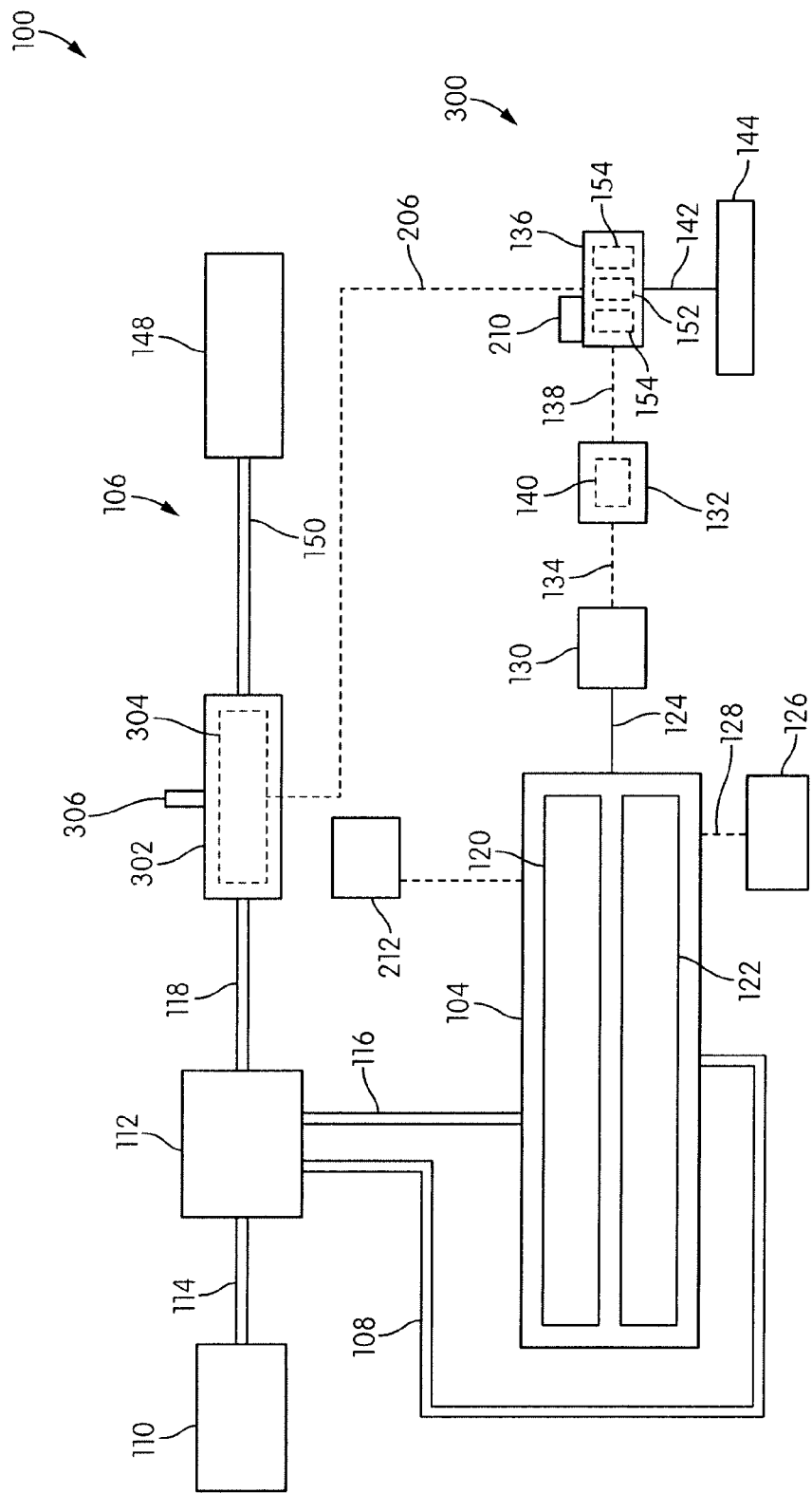
FIG. 3 is a block schematic diagram of an example combustion-electric propulsion system having another example brake activated heating system.

FIG. 3 depicts another example brake activated heating system 300 for the combustion-electric propulsion system 100. The aforementioned descriptions of the brake activated heating system 200 and components thereof similarly apply to the brake activated heating system 300 and components thereof. As shown in FIG. 3, the brake activated heating system 300 includes many of the aforementioned components of the brake activated heating system 200.

The brake activated heating system 300 includes an electric aftertreatment component 302 that receives exhaust from the second outlet conduit 118. The electric aftertreatment component 302 functions similar to the aftertreatment component 146 as previously described. In this way, the electric aftertreatment component 302 replaces the aftertreatment component 146 in the combustion-electric propulsion system 100. The electric aftertreatment component 302 receives electric energy from the electric motor 136 via wires 206 when the combustion-electric propulsion system 100 is in the brake mode.

Additionally, the electric aftertreatment component 302 includes resistance elements 304. The resistance elements 304 function similar to the resistance elements 208 as previously described. The resistance elements 304 may heat the exhaust within the electric aftertreatment component 302. Additionally or alternatively, the resistance elements 304 may directly heat the electric aftertreatment component 302. In these ways, the resistance elements 304 may be used to, for example, clean carbon deposits within the electric aftertreatment component 302, prevent excess accumulation of unburned hydrocarbons within the electric aftertreatment component 302, and prevent the plugging of catalyst channels within the electric aftertreatment component 302 with deposits such as coking, ammonium bisulfate, and urea compounds.

The resistance elements 304 may be incorporated in the interior of the electric aftertreatment component 302. Alternatively, the resistance elements 304 may be incorporated within, or outside of, the electric aftertreatment component 302. In this way, portions of the electric aftertreatment component 302 may be at least partially shielded from heat provided by the resistance elements 304. In an exemplary embodiment, the resistance elements 304 are electrically isolated from the electric aftertreatment component 302.

The resistance elements 304 are electrically resistive catalysts. The resistance elements 304 may be constructed from electrically resistant substrates. In some embodiments, the resistance elements 304 are constructed from a metallic substrate. In other embodiments, the resistance elements 304 are constructed from silicon carbide.

The brake activated heating system 300 may be particularly advantageous because a separate resistance heater is not required. Both the brake activated heating system 200 and the brake activated heating system 300 may be provided to a user for use in a retrofit application (e.g., to be installed on a currently used vehicle as opposed to a new vehicle). In this regard, the brake activated heating system 300 may be particularly advantageous because installation time may be reduced through the use of the electric aftertreatment component 302.

In an exemplary embodiment, the brake activated heating system 300 is implemented to provide electric energy generated by the electric motor 136 to the resistance elements 304 (i.e., to heat the exhaust) and to the alternator 130 to motor the internal combustion engine 104 and thereby cool the electric aftertreatment component 302. For example, the ECM 126 may cause a first portion of the electric energy generated by the electric motor 136 to be provided to the resistance elements 304 and a second portion of the electric energy generated by the electric motor 136 to be provided to the alternator 130 to motor the internal combustion engine. In an exemplary embodiment, motoring of the internal combustion engine 104 causes corresponding rotation of a fan 212 that is structured to provide cooling to the electric aftertreatment component 302.

According to various embodiments, the brake activated heating system 300 includes a sensor 306 coupled to the electric aftertreatment component 302. The sensor 306 is electronically communicable with the ECM 126 and configured to provide a signal (e.g., sensor data, etc.) to the ECM 126. In some embodiments, the sensor 306 is configured to measure an amount of deposits within the electric aftertreatment component 302. The sensor 306 may measure the amount of deposits at a target location within the electric aftertreatment component 302 (e.g., proximate the second outlet conduit 118, proximate the third outlet conduit 150, etc.). The ECM 126 is configured to receive the signal from the electric aftertreatment component 302 and determine the amount of deposits based on the signal. The ECM 126 then may compare the amount of deposits to a threshold (e.g., a maximum deposit amount, etc.). Based on the comparison, the ECM 126 may selectively power at least one of the resistance elements 304. The ECM 126 may continue to monitor the signal received from the sensor 306 to determine when the amount is below a second threshold at which point the ECM 126 may cease to power the resistance elements 304.

IV. Example Idle Activated Heating Systems

Figure 4:
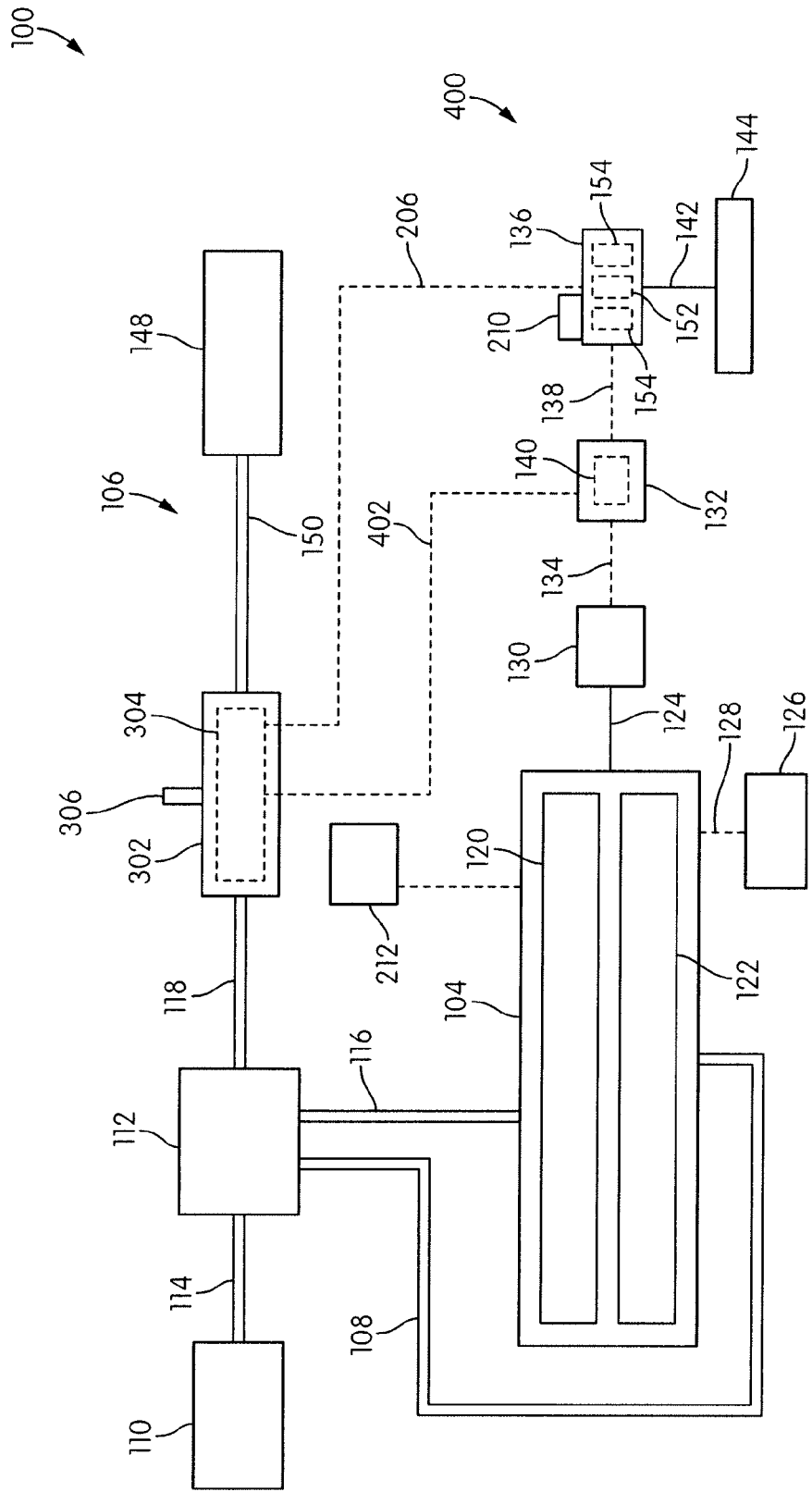
FIG. 4 is a block schematic diagram of an example combustion-electric propulsion system having an example idle activated heating system.

FIG. 4 depicts an example idle activated heating system 400 for the combustion-electric propulsion system 100. The aforementioned descriptions of the brake activated heating system 300 and components thereof similarly apply to the idle activated heating system 400 and components thereof. As shown in FIG. 4, the idle activated heating system 400 includes the aforementioned components of the brake activated heating system 200 and the brake activated heating system 300. Additionally, the idle activated heating system 400 includes wires 402 between the energy storage device 132 and the electric aftertreatment component 302. In some embodiments, the wires 402 are coupled to the alternator 130 and the electric aftertreatment component 302 such that the alternator 130 can provide electric energy directly to the resistance elements 304. In these embodiments, the alternator controller 140 is disposed along the wires 402 or otherwise contained within the alternator 130 such that the alternator controller 140 provides control over electric energy provided by the alternator 130 to the resistance elements 304. For example, the resistance elements 304 may be provided electric energy such that the resistance elements 304 obtain a temperature of approximately two-hundred and fifty degrees Celsius.

Unlike the brake activated heating system 300, the idle activated heating system 400 is configured to provide electric energy from the energy storage device 132 and/or the alternator 130 to the electric aftertreatment component 302 when the combustion-electric propulsion system 100 is not in the drive mode or the brake mode and is instead in an idle mode. In the idle mode, the user is not providing an acceleration input (e.g., through depression of an acceleration pedal, etc.) or a braking input (e.g., through depression of a brake pedal, etc.). For example, the combustion-electric propulsion system 100 may be in the idle mode when a vehicle is stopped at a stop light and when a vehicle is being loaded with material (e.g., when train cars are loaded with cargo, etc.).

According to some embodiments, the idle activated heating system 400 is configured to only provide electric energy to the electric aftertreatment component 302 when the vehicle has been in idle for a target period of time, as measured by the ECM 126. For example, the idle activated heating system 400 may be configured to provide electric energy from the alternator 130 to the electric aftertreatment component 302 when the vehicle has been in idle for five minutes. In this way, wear and tear on the alternator 130, the energy storage device 132, the wires 402, the electric aftertreatment component 302, and/or the resistance elements 304 may be minimized by avoiding repeated cycling (e.g., providing electric energy to the electric aftertreatment component 302 and then ceasing to provide electric energy to the electric aftertreatment component 302, etc.) that would otherwise frequently occur during operation of a vehicle. In one example, the ECM 126 is configured to compare a duration of time that the ECM 126 has been in the idle mode to a threshold. In this example, the ECM 126 is configured to power at least one of the resistance elements 304 if the duration of time exceeds the threshold.

In an exemplary embodiment, the ECM 126 is configured to calculate a quantity of condensed hydrocarbons. The quantity of condensed hydrocarbons may be measured on a unit of fuel basis, an amount of time basis, a temperature (e.g., temperature of the electric aftertreatment component 302, etc.) basis, or other similar basis. The ECM 126 may store an upper threshold related to a maximum desired amount of condensed hydrocarbons and a lower threshold related to a minimum desired amount of hydrocarbons.

When the quantity of condensed hydrocarbons in the electric aftertreatment component 302, as measured by the ECM 126, exceeds the upper threshold, the ECM 126 is configured to transmit a signal to the alternator controller 140 to instruct the alternator controller 140 to provide electric energy to the electric aftertreatment component 302. The ECM 126 may continuously monitor the quantity of condensed hydrocarbons such that the ECM 126 can detect when the quantity of hydrocarbons is less than the lower threshold. When the quantity of the condensed hydrocarbons in the electric aftertreatment component 302, as measured by the ECM 126, is less than the lower threshold, the ECM 126 is configured to transmit a signal to the alternator controller 140 to instruct the alternator controller 140 to cease providing electric energy to the electric aftertreatment component 302.

In these ways, the ECM 126 can utilize the upper and lower thresholds to cause selective heating of the electric aftertreatment component 302 and thereby selective cleaning (e.g., removal of deposited hydrocarbons, etc.) of the electric aftertreatment component 302. In some applications, the ECM 126 causes the speed of the internal combustion engine 104 to compensate for providing electric energy to the electric aftertreatment component 302. In one embodiment, the upper threshold is equal to the lower threshold.

Figure 5:
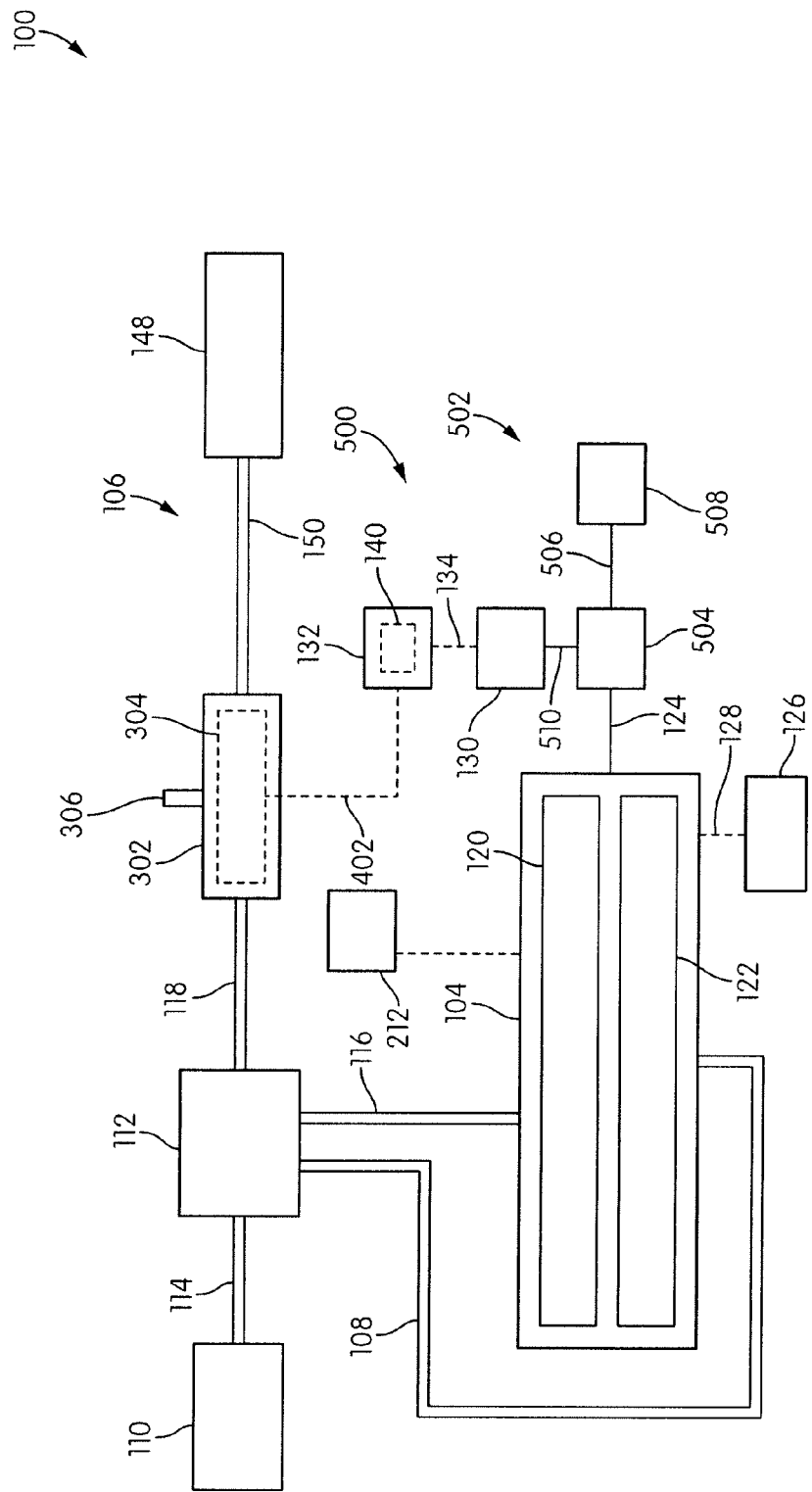
FIG. 5 is a block schematic diagram of an example combustion-electric propulsion system having another example idle activated heating system.

FIG. 5 depicts an example idle activated heating system 500 for the combustion-electric propulsion system 100 implementing a mechanical drive 502. The aforementioned descriptions of the idle activated heating system 400 and components thereof similarly apply to the idle activated heating system 500 and components thereof. As shown in FIG. 5, the idle activated heating system 500 includes some of the aforementioned components of the idle activated heating system 400.

The mechanical drive 502 includes a clutch 504, a driveshaft 506, and a movement member 508. The clutch 504 is configured to selectively couple rotation of the driveshaft 506 to rotation of the driveshaft 124. The driveshaft 506 is coupled to the movement member 508. Accordingly, rotation of the driveshaft 124 selectively causes rotation of the movement member 508. The movement member 508 may be, for example, a propeller, a hydraulic pump, a gearbox, or any other similar device.

The clutch 504 is operable between an engaged state and a disengaged state. When the clutch 504 is in the engaged state, the combustion-electric propulsion system 100 may be in either the drive mode or the brake mode and rotation of the driveshaft 124 is coupled to rotation of the driveshaft 506. When the clutch 504 is in the disengaged state, the combustion-electric propulsion system 100 may be in the idle mode and rotation of the driveshaft 124 is not coupled to rotation of the driveshaft 506.

In the idle activated heating system 500, the alternator 130 is coupled to, or selectively coupled to, the clutch 504 via a linkage 510. In some embodiments, the alternator 130 is configured to generate electric energy with any rotation of the driveshaft 124, regardless of whether the clutch 504 is in the engaged state or the disengaged state. In other embodiments, the alternator 130 is configured to only generate electric energy with rotation of the driveshaft 124 when the clutch 504 is in the disengaged state.

IV. Example Electric Aftertreatment Component

Figure 6:
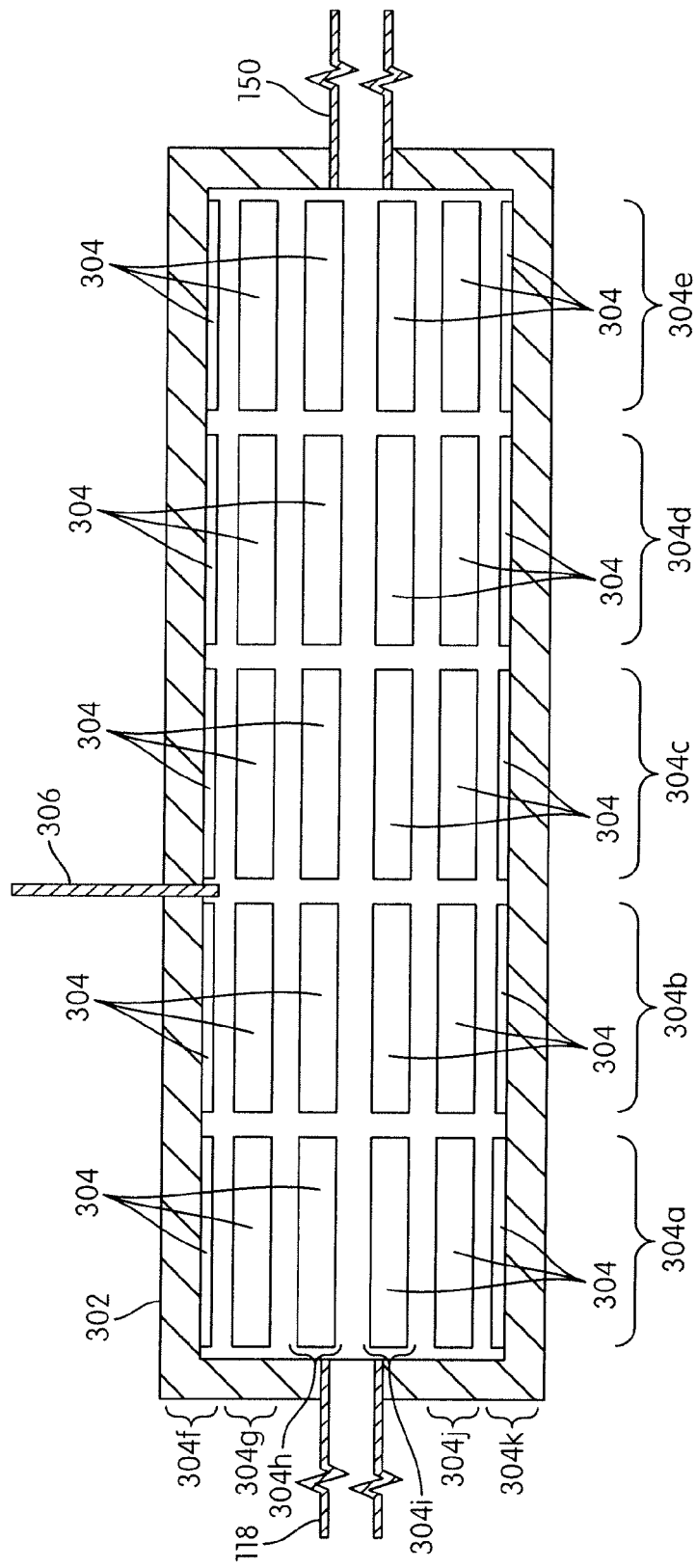
FIG. 6 is a cross-sectional view of an electric aftertreatment component for use in a combustion-electric propulsion system.

FIG. 6 illustrates a cross-sectional view of an example electric aftertreatment component 302. As shown in FIG. 6, the electric aftertreatment component 302 includes a plurality of resistance elements 304. The resistance elements 304 may be arranged in a plurality of uniform columns 304a-304e and a plurality of uniform rows 304f-304k that are annularly spaced within the electric aftertreatment component 302. As used herein, a "column" refer to a series of resistance elements 304 being aligned along a circumferential surface of the electric aftertreatment component 302, each being at the substantially the same specific longitudinal distance from the inlet or outlet of the electric aftertreatment component 302. A "row" refers to a series of resistance elements aligned longitudinally along a length of the electric aftertreatment component 302 (as opposed to being aligned circumferentially). The number of resistance elements 304 in the electric aftertreatment component 302 may be related to a construction and/or configuration of the electric aftertreatment component 302. The resistance elements 304 may be uniformly arranged, such as in a symmetric pattern, or randomly arranged, such as in an asymmetric pattern.

According to various embodiments, each of the resistance elements 304 may be individually controlled to provide heat. For example, only the resistance elements 304 in a column 304a may be provided electric energy for a first period of time and then only the resistance elements 304 in another column 304b may be provided electric energy after the first period of time. This process may be iteratively repeated for all of the columns. Similarly, this process may be implemented with rows of the resistance elements 304 or a combination of rows and columns of the resistance elements 304. In these ways, the resistance elements 304 may progressively and incrementally provide heat to the electric aftertreatment component 302. For example, the resistance elements 304 may be controlled so that the electric aftertreatment component 302 is incrementally cleaned from an inlet of the electric aftertreatment component 302, proximate the second outlet conduit 118, to an outlet of the electric aftertreatment component 302, proximate the third outlet conduit 150.

Figure 7:
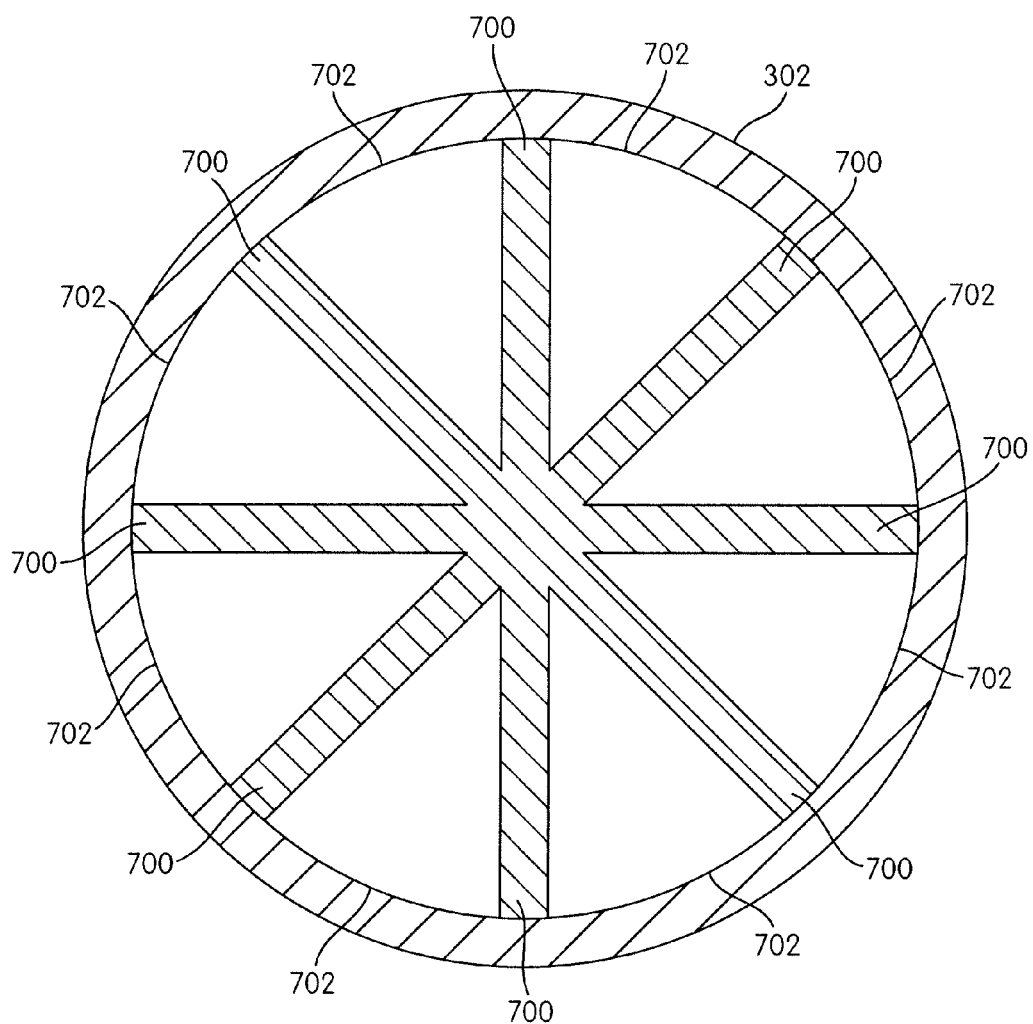
FIG. 7 is another cross-sectional view of an electric aftertreatment component for use in a combustion-electric propulsion system.

As shown in FIG. 7, the electric aftertreatment component 302 includes a number of flow dividers 700 that define a number of sub flow paths 702. The exhaust traverses each of the sub flow paths 702 between an inlet of the electric aftertreatment component 302 and an outlet of the electric aftertreatment component 302. In some embodiments, the exhaust in one of the sub flow paths 702 is structurally separated from the exhaust in the others of the sub flow paths 702.

The resistance elements 304 are located within the sub flow paths 702. For example, the rows 304f-304k may each be aligned with one of the sub flow paths 702. The resistance elements 304 on each of the sub flow paths 702 may be on an independent circuit such that the resistance elements 304 on multiple sub flow paths 702 may be powered simultaneously. In this way, each of the sub flow paths 702 may be individually and incrementally cleaned by the resistance elements 304.

The number of resistance elements 304 within a sub flow path 702 that are powered may depend on, for example, the electric energy available from the alternator 130. In another example, the number of resistance elements 304 within the sub flow path 702 that are powered depends on a flow rate of exhaust, as measured by a sensor and determined by the ECM 126. Additionally, some or all of the resistance elements 304 within multiple sub flow paths 702 may be powered simultaneously. In these ways, an entire length of each sub flow path 702 may be cleaned. Alternatively, only certain portions of each sub flow path 702 may be cleaned. For example, only the portion of the sub flow path 702 that is between 2.54 centimeters (e.g., one inch, etc.) from an inlet of the electric aftertreatment component and 15.24 centimeters (e.g., six inches, etc.) from the inlet may be cleaned.

In an exemplary embodiment, the ECM 126 determines how much electric energy is generated by the alternator 130 and compares the amount of electric energy generated by the alternator 130 to a plurality of thresholds, each threshold associated with a different one of the flow sub paths 702. Based on the comparison, the ECM 126 may selectively power the resistance elements 304 within the flow sub path 702 for which the threshold was exceeded.

In some embodiments, some or all of the resistance elements 304 are replaced with relatively small electric heaters. In another embodiment, all of the resistance elements 304 are replaced with a single heater that has zone control to facilitate cleaning of different zones (e.g., a zone corresponding to each of the sub flow paths 702, etc.) of the electric aftertreatment component 302.

In some applications, the electric aftertreatment component 302 is provided heat from other heat sources associated with operation of the internal combustion engine 104. For example, the electric aftertreatment component 302 may be provided heat from an oil circulation system, and engine coolant system, an energy recuperating suspension system, and other similar systems.

IV. Construction of Exemplary Embodiments

As described herein, the internal combustion engine 104 is a diesel engine configured to combust diesel fuel. However, the internal combustion engine 104 may be an internal combustion engine that is configured to combust other fuel (e.g., diesel fuel, gasoline, propane, natural gas, etc.). For example, the internal combustion engine 104 may be a gasoline engine, a propane engine, a natural gas (e.g., liquid natural gas, etc.) engine, an ethanol engine, or other similar engines.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "in fluid communication" and the like, as used herein, mean the two components or objects have a pathway formed between the two components or objects in which a fluid, such as exhaust, water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another. As described herein, "preventing" should be interpreted as potentially allowing for de minimus circumvention (e.g., less than 1%) of the exhaust gases around the substrate 216 or the flow dissipater 214.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. A combustion-electric propulsion system comprising:
    an engine control module configured to receive an input from a user, the input corresponding to a drive command or a brake command, the engine control module configured to enter a drive mode while receiving the drive command and to enter a brake mode while receiving the brake command;
    an electric motor electrically communicable with an alternator and the engine control module, the electric motor configured to receive electric energy from the alternator, to utilize the electric energy to cause rotation of a movement member in the drive mode, and to generate electric energy from rotation of the movement member when in the brake mode; and
    an electric aftertreatment component configured to treat exhaust, the electric aftertreatment component comprising a plurality of resistance elements that are electrically communicable with the electric motor;
    wherein the electric motor transmits a first portion of the electric energy to the plurality of resistance elements when in the brake mode such that the plurality of resistance elements heat at least one of the exhaust and the electric aftertreatment component; and
    wherein the electric motor simultaneously transmits a second portion of the electric energy to the alternator when in the brake mode.

2. The combustion-electric propulsion system of claim 1, wherein the engine control module is configured to utilize the electric energy received by the alternator from the electric motor when in the brake mode to motor an internal combustion engine.

3. The combustion-electric propulsion system of claim 2, wherein the motoring of the internal combustion engine causes rotation of a fan that is configured to provide cooling to the electric aftertreatment component.

4. The combustion-electric propulsion system of claim 1, wherein the plurality of resistance elements are uniformly arranged on an inner surface of the electric aftertreatment component in a plurality of rows of resistance elements and a plurality of columns of resistance elements;
    wherein the resistance elements in each of the plurality of rows are controllable independent from the resistance elements in the others of the plurality of rows; and
    wherein the resistance elements in each of the plurality of columns are controllable independent from the resistance elements in the others of the plurality of columns.

5. The combustion-electric propulsion system of claim 4, wherein the electric aftertreatment component comprises a plurality of sub flow paths through which the exhaust traverses between an inlet of the electric aftertreatment component and an outlet of the electric aftertreatment component; and
    wherein the exhaust in one of the plurality of sub flow paths is separated from the exhaust in the others of the plurality of sub flow paths.

6. The combustion-electric propulsion system of claim 5, wherein the number of rows of resistance elements is equal to the number of sub flow paths of the electric aftertreatment component; and
    wherein each of the plurality of rows is located within one of the plurality of sub flow paths such that each of the plurality of rows is configured to heat at least one of the exhaust and a portion the electric aftertreatment component within one of the plurality of sub flow paths.

7. The combustion-electric propulsion system of claim 6, wherein the engine control module is configured to determine an amount of electric energy generated by the alternator and compare the amount of electric energy generated by the alternator to at least one threshold;
   wherein each of the at least one threshold is associated with at least one of the plurality of sub flow paths; and
   wherein the engine control module is configured to power the resistance elements in each of the plurality of rows associated with each of the sub flow paths for which the associated threshold is exceeded by the amount of electric energy generated by the alternator.

8. The combustion-electric propulsion system of claim 6, wherein the engine control module is configured to incrementally clean the electric aftertreatment component by:
   (i) powering only the resistance elements in a target row that is one of the plurality of rows to apply heat to the electric aftertreatment component using the resistance elements in the target row;
   (ii) ceasing to power the resistance elements in the target row when a condition is met; and
   (iii) repeating steps (i) and (ii) for the others of the plurality of rows.

9. The combustion-electric propulsion system of claim 1, further comprising a sensor coupled to the electric aftertreatment component, the sensor electrically communicable with the engine control module and configured to measure an amount of deposits within the electric aftertreatment component and to transmit a signal to the engine control module, the signal indicative of the amount of deposits,
   wherein the engine control module is configured to compare the amount of deposits to a deposit threshold.

10. The combustion-electric propulsion system of claim 9, wherein the engine control module is configured to increase the second portion of electric energy in response to determining that the amount of deposits exceeds the deposit threshold.

11. The combustion-electric propulsion system of claim 1, further comprising a sensor coupled to the electric aftertreatment component, the sensor electrically communicable with the engine control module and configured to measure a temperature within the electric aftertreatment component and to transmit a signal to the engine control module, the signal indicative of the temperature;
   wherein the engine control module is configured to compare the temperature to a target temperature; and
   wherein the engine control module increases one of the first portion and the second portion and decreases the other of the first portion and the second portion based on the comparison between the temperature and the target temperature.

12. The combustion-electric propulsion system of claim 11, wherein the alternator provides the second portion to a fan in order to cool the electric aftertreatment component.

13. A combustion-electric propulsion system comprising:
   an alternator configured to receive a rotational input from a driveshaft and to utilize the rotational input to generate electric energy;
   an engine control module configured to receive an input, the input corresponding to a drive command or a brake command, the engine control module configured to enter an idle mode while not receiving the drive command or the brake command; and
   an electric aftertreatment component configured to treat exhaust, the electric aftertreatment component comprising a plurality of resistance elements that are electrically communicable with the alternator;
   wherein the alternator is configured to selectively transmit the electric energy to the plurality of resistance elements when in the idle mode such that the plurality of resistance elements heat at least one of the exhaust and the electric aftertreatment component.

14. The combustion-electric propulsion system of claim 13, wherein the engine control module is configured to measure a duration of time from when the engine control module enters the idle mode;
   wherein the engine control module is configured to compare the duration of time to a threshold; and
   wherein the engine control module is configured to cause the alternator to transmit the electric energy to the resistance elements in response to determining that the duration of time exceeds the threshold.

15. The combustion-electric propulsion system of claim 13, further comprising a sensor coupled to the electric aftertreatment component;
   wherein the sensor is electrically communicable with the engine control module and configured to measure an amount of deposits within the electric aftertreatment component and to transmit a signal to the engine control module, the signal indicative of the amount of deposits; and
   wherein the engine control module is configured to compare the amount of deposits to a deposit threshold.

16. The combustion-electric propulsion system of claim 15, wherein the engine control module is configured to cause the alternator to transmit the electric energy to the resistance elements in response to determining that the amount of deposits exceeds the deposit threshold.

17. The combustion-electric propulsion system of claim 13, wherein the electric aftertreatment component comprises a plurality of sub flow paths through which the exhaust traverses between an inlet of the electric aftertreatment component and an outlet of the electric aftertreatment component;
   wherein the exhaust in one of the plurality of sub flow paths is separated from the exhaust in the others of the plurality of sub flow paths;
   wherein the plurality of resistance elements are divided between the plurality of sub flow paths such that at least one resistance element is disposed within each of the plurality of sub flow paths; and
   wherein the at least one resistance element disposed within one of the sub flow paths are controllable independent from the at least one resistance element disposed within the others of the sub flow paths.

18. The combustion-electric propulsion system of claim 13 further comprising an electric motor electrically communicable with the alternator and the engine control module, the electric motor configured to receive the electric energy from the alternator;
   wherein the engine control module is configured to enter a drive mode while receiving the drive command and to enter a brake mode while receiving the brake command; and
   wherein the electric motor is configured to utilize the electric energy to cause rotation of a movement member in the drive mode and to generate electric energy from rotation of the movement member when in the brake mode.

19. A combustion-electric propulsion system comprising:
   a clutch configured to receive a rotational input from a driveshaft, the clutch operable between an engaged state and a disengaged state, the clutch configured to provide a rotational output only when in the engaged state;

a movement member selectively coupled to the clutch and configured to receive the rotational output provided by the clutch when the clutch is in the engaged state;

an alternator configured to receive a rotational input from the clutch when the clutch is in the engaged state and the disengaged state, the alternator configured to utilize the rotational input to generate electric energy;

an engine control module configured to receive an input corresponding to a drive command, the engine control module configured to enter an idle mode while not receiving the drive command; and an electric aftertreatment component configured to treat exhaust, the electric aftertreatment component defined by a plurality of flow sub paths, the electric aftertreatment component comprising a plurality of resistance elements that are electrically communicable with the alternator and arranged within the plurality of flow sub paths such that each of the plurality of flow sub paths is configured to be independently heated by the plurality of resistance elements;

wherein the alternator is configured to selectively transmit the electric energy to the plurality of resistance elements when in the idle mode such that the plurality of resistance elements heat at least one of the exhaust and the electric aftertreatment component.

20. The combustion-electric propulsion system of claim 19, further comprising a sensor coupled to the electric aftertreatment component, the sensor electrically communicable with the engine control module and configured to measure an amount of deposits within the electric aftertreatment component and to transmit a signal to the engine control module, the signal indicative of the amount of deposits;

wherein the engine control module is configured to compare the amount of deposits to a deposit threshold; and wherein the engine control module is configured to determine at least one target flow sub path based on the comparison between the amount of deposits and the deposit threshold and in response to determining that the amount of deposits exceeds the deposit threshold.

21. The combustion-electric propulsion system of claim 20, wherein the engine control module is configured to cause the at least one resistance element in the at least one target flow sub path to be powered.

22. The combustion-electric propulsion system of claim 21, wherein the engine control module is configured to incrementally clean the electric aftertreatment component by:

(i) powering only the at least one resistance element in the at least one target flow sub path;

(ii) ceasing to power the at least one resistance element in the at least one target flow sub path when a condition is met; and (iii) repeating (i) and (ii) for the others of the plurality of the flow sub paths.

* * * * *